(12) United States Patent
Moor et al.

(10) Patent No.: US 6,666,610 B1
(45) Date of Patent: Dec. 23, 2003

(54) FOLDER

(75) Inventors: Marc L. Moor, Oakwood, OH (US); Thomas DeBlasis, Pittsburgh, PA (US)

(73) Assignee: MeadWestvaco Corporation, Stamford, CT (US)

( * ) Notice: Subject to any disclaimer, the term of this patent is extended or adjusted under 35 U.S.C. 154(b) by 0 days.

(21) Appl. No.: 09/526,929

(22) Filed: Mar. 16, 2000

Related U.S. Application Data (60) Provisional application No. 60/150,024, filed on Aug. 20, 1999, and provisional application No. 60/124,943, filed on Mar. 18, 1999.

(51) Int. Cl.$^7$ .................................................. B42F 13/00
(52) U.S. Cl. ........................ 402/79; 229/67.1; 281/38; 281/51; 402/73; 402/80 P; D19/33
(58) Field of Search ...................... 281/15.1, 29, 38, 281/45, 51; 402/70, 73, 71, 79, 80 R, 80 P; 229/500, 67.1; D19/33

(56) References Cited

U.S. PATENT DOCUMENTS

| | | | |
|---|---|---|---|
| 717,957 A | | 1/1903 | Weaver |
| 792,747 A | | 6/1905 | Anderson et al. |
| 852,871 A | | 5/1907 | Cohn |
| 868,758 A | | 10/1907 | Bexell |
| 868,835 A | | 10/1907 | Bexell |
| 1,107,351 A | | 8/1914 | Proudfit |
| 1,156,160 A | | 10/1915 | Lewis |
| 1,371,459 A | | 3/1921 | Amlie |
| 1,794,560 A | | 3/1931 | Styll |
| 2,153,575 A | | 4/1939 | Kramer .................. 129/18 |
| 2,848,163 A | | 8/1958 | Serrell .................. 235/61.12 |
| 3,528,602 A | * | 9/1970 | Ritchie |
| 3,680,969 A | * | 8/1972 | Groman |
| 3,913,740 A | * | 10/1975 | Bisberg .................. 206/472 |
| 4,109,850 A | * | 8/1978 | Meenan et al. .......... 229/67.3 |
| 4,551,039 A | | 11/1985 | Basseches .................. 402/60 |
| 4,602,734 A | * | 7/1986 | Thompson .............. 229/1.5 R |
| 4,636,179 A | | 1/1987 | Gentile et al. .................. 402/79 |
| 4,639,157 A | * | 1/1987 | Herzfeld .................. 402/19 |
| 4,940,353 A | | 7/1990 | Osono et al. .................. 402/79 |
| 4,989,777 A | * | 2/1991 | Miller .................. 229/1.5 R |
| 5,015,114 A | | 5/1991 | Miller .................. 402/4 |
| 5,025,978 A | * | 6/1991 | Pacione .................. 229/1.5 R |
| 5,161,731 A | * | 11/1992 | Rivlin et al. .......... 229/1.5 R |
| 5,234,277 A | | 8/1993 | Le .................. 402/79 |
| 5,405,169 A | | 4/1995 | Schwartz .................. 281/16 |
| 5,417,509 A | | 5/1995 | Schwartz .................. 402/79 |
| 5,433,546 A | | 7/1995 | Kershaw .................. 402/79 |
| 5,503,487 A | * | 4/1996 | Ong .................. 402/79 |
| 5,572,815 A | | 11/1996 | Kovner .................. 40/404 |
| 5,671,950 A | * | 9/1997 | Hanson .................. 281/29 |
| 5,709,496 A | | 1/1998 | Werner et al. .................. 402/79 |
| 5,722,694 A | * | 3/1998 | Baldursson .................. 283/116 |
| 5,727,894 A | | 3/1998 | Covey .................. 402/79 |
| 5,806,894 A | | 9/1998 | Dottel |
| 5,845,772 A | | 12/1998 | Cieplak .................. 206/308.3 |
| 5,882,038 A | * | 3/1999 | Ong .................. 281/31 |
| 5,893,585 A | * | 4/1999 | Worthen .................. 281/45 |
| 5,913,540 A | * | 6/1999 | Ong .................. 281/31 |
| 6,068,298 A | * | 5/2000 | Chen .................. 281/38 |
| 6,116,651 A | * | 9/2000 | Makofsky et al. .................. 281/29 |
| 6,209,778 B1 | * | 4/2001 | Henrikson et al. .......... 229/67.1 |
| 6,382,864 B1 | * | 5/2002 | Moor .................. 206/37 |

FOREIGN PATENT DOCUMENTS

| | | |
|---|---|---|
| EP | 0554693 | 8/1993 |
| FR | 2593313 | 7/1987 |
| FR | 2748694 | 11/1997 |
| NL | 7810440 | 4/1980 |

* cited by examiner

Primary Examiner—Monica Carter
(74) Attorney, Agent, or Firm—Thompson Hine LLP (57) ABSTRACT

A folder for receiving papers including a first side panel including a recess formed in an edge thereof, and a first lower panel facing the side panel. The first side panel and the first lower panel are joined to form a pocket therebetween, and the recess is located adjacent an open end of the pocket to enable the pocket to expand without tearing the first side panel.

48 Claims, 6 Drawing Sheets

FOLDER

This application claims priority to U.S. Provisional Ser. No. 60/150,024, filed Aug. 20, 1999, and U.S. Provisional Application Ser. No. 60/124,943, filed Mar. 18, 1999. The contents of both of these applications are hereby incorporated by reference.

FIELD OF THE INVENTION

The present invention is directed to a folder for receiving papers.

BACKGROUND OF THE INVENTION

Folders are often used by students, professionals, and others to store loose leaf papers, hand-outs, pamphlets, and other items. However, most existing folders can receive only limited amounts of papers and other items before the sides of the folders tend to pull away and rip from the body of the folder. Many existing folders also often include a set of holes formed in the body of the folder to attach the folder to a binder, such as a standard three ring binder. However, when the folder is mounted in a binder, the papers received in the folder may contact the binder rings, which can crush or wrinkle the items in the folder. Furthermore, the binder rings can pull or rip through the holes in the folder. Accordingly, there is a need for a folder that is expandable to receive large volumes of paper. There is also a need for a folder that can be mounted to a binder such that the items received in the folder are not damaged by the binder, and that resists tearing by the rings of the binder.

SUMMARY OF THE INVENTION

In one embodiment, the invention is a folder that can expand to receive large volumes of paper. In particular, the pockets of the folder includes expansions panels which allow the pockets to expand. The corners of the pockets may include notches to increase the expansion capability of the binder pockets. The folder may also include a spine that extends from a rear surface of the folder. The spine includes a set of binder-receiving holes such that the interior of the folder is isolated from the rings of the binder. The spine is preferably reinforced to resist tearing forces imparted by the rings of the binder.

In a preferred embodiment, the invention is a folder for receiving papers including a first side panel including a recess formed in an edge thereof, and a first lower panel facing the side panel. The first side panel and the first lower panel are joined to form a pocket therebetween, and the recess is located adjacent an open end of the pocket to enable the pocket to expand without tearing the first side panel.

Other objects and advantages of the present invention will be apparent from the following description and the accompanying drawings.

DETAILED DESCRIPTION

Figure 2:
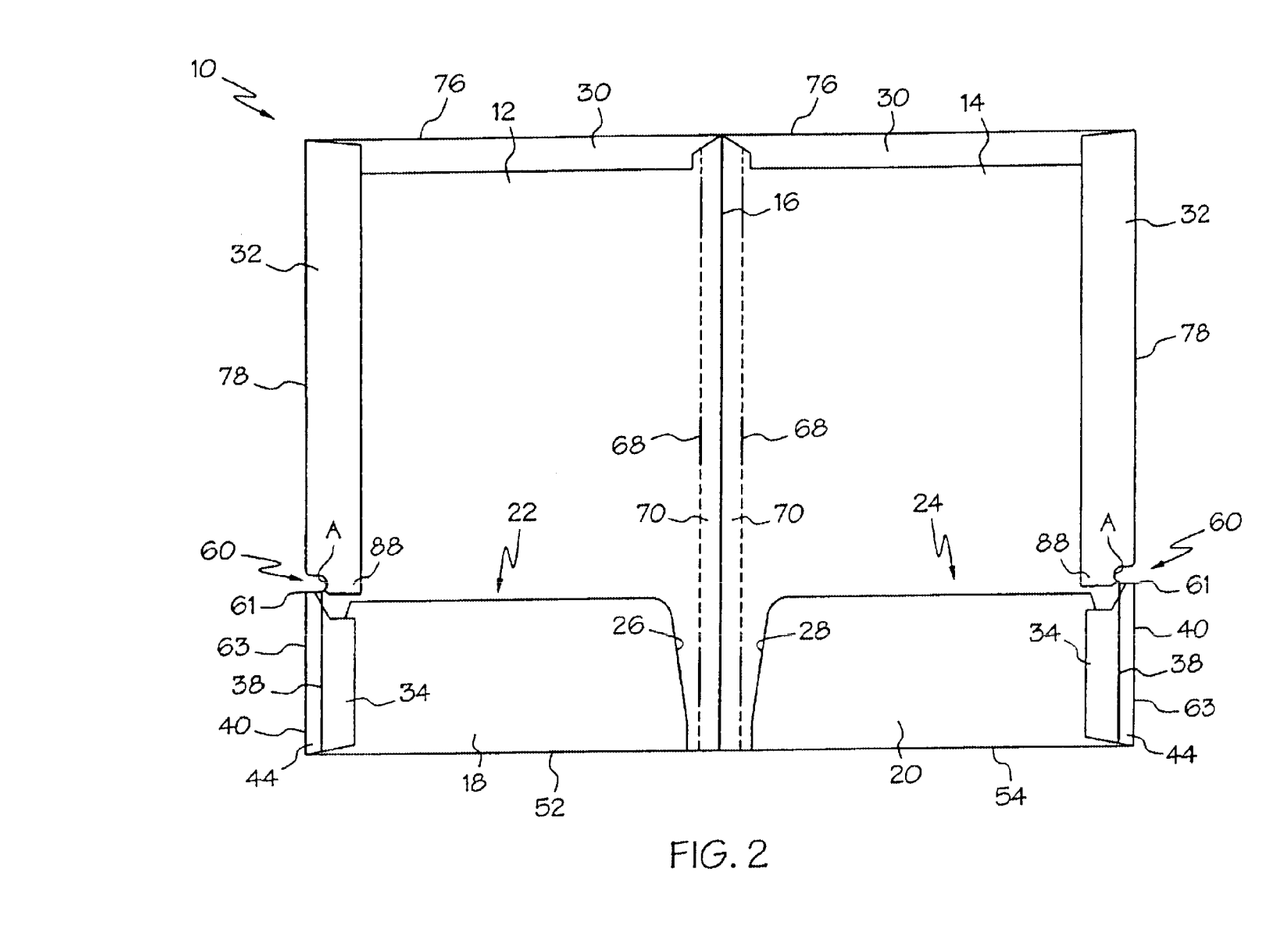
FIG. 2 is a front view of the folder of FIG. 1, shown in its open position.
Figure 6:
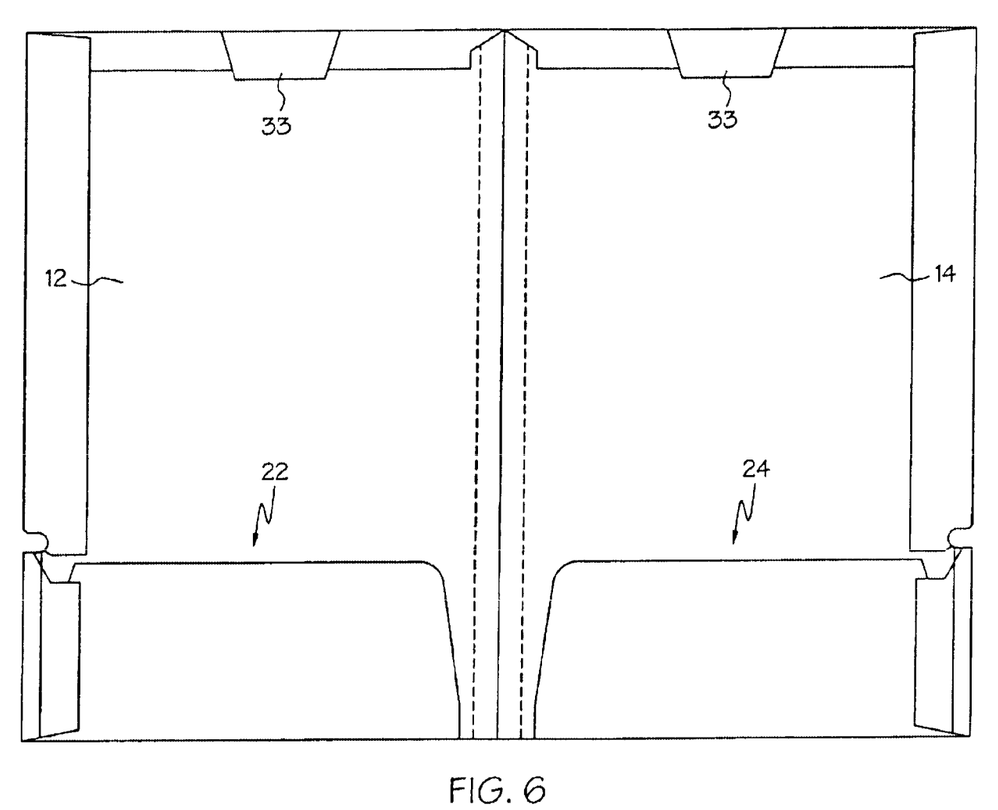
FIG. 6 is a front view of another embodiment of the folder of the present invention.

As shown in FIG. 2, in one embodiment the invention is a folder 10 having a pair of opposed, attached side panels 12, 14 separated by a center fold line 16. Side panel 12 forms a front panel of the folder 10, and side panel 14 forms a back panel of the folder 10. The folder 10 includes a pair of lower panels 18, 20, that each face a respective side panel 12, 14. The lower panel 18 and side panel 12 form a pocket 22 for receiving papers and other loose items. Similarly, the lower panel 20 and side panel 14 form a pocket 24 between the lower panel 20 and the side panel 14. Each lower panel 18, 20 each includes a tapered inner surface 26, 28 to facilitate sliding papers under the lower panels 18, 20 in a lateral direction. As shown in FIG. 6, each side panel 12, 14 may include a flap 33 extending from its upper edge to help retain papers in the pockets 22, 24. The flaps 33 also help to protect the edges of the papers received in the pockets 22, 24. The flaps 33 may also be used to sort papers received in the pockets 22, 24, for example by separating the papers in each pocket into two stacks (one stack located above a flap 33, and the other located below a flap 33). The flaps 33 may be located at a variety of positions and take a variety of shapes beyond those illustrated herein.

Figure 4:
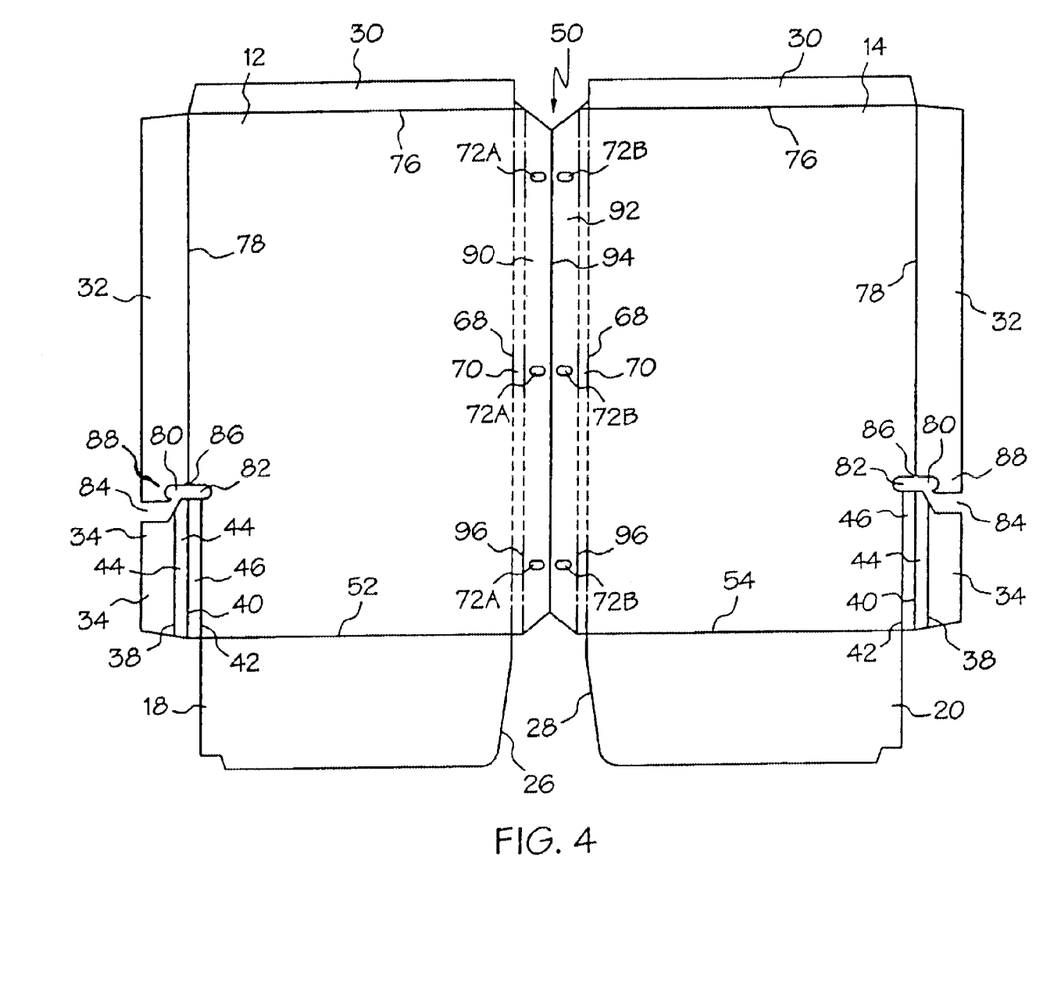
FIG. 4 is a front view of a blank used to form the folder of FIG. 1.

Returning to FIG. 2, each side panel 12, 14 includes a top reinforcing strip 30, side reinforcing strip 32, and a pocket reinforcing strip 34 to increase the strength of the folder 10. As shown in FIG. 4, the pocket reinforcing strip 34 includes an inner 38, middle 40, and outer 42 fold line. The fold lines 38, 40, 42 define a first expansion panel 44 and a second expansion panel 46. As will be discussed in greater detail below, in order to form the folder 10 from the blank 50 shown in FIG. 4, the lower panels 18, 20 are folded about the fold lines 52, 54 until they lie against their respective side panels 12, 14. Each pocket reinforcing strip 34 is then folded about its middle fold line 40, and the pocket reinforcing strip 34 is then glued to its respective lower panel 18, 20. The outer fold line 42 and the second expansion panel 46 are located on the outer surface of the folder (see FIG. 1), and the inner fold line 38 and the second expansion panel 44 are located on the inner surface of the folder (see FIG. 2).

Returning to FIG. 2, each side panel 12, 14 also includes an inwardly-extending notch, or recess 60, located on the outer edge of the side panels 12, 14 and at the top edge of each lower panel 18, 20. The notch 60 is located adjacent the open end of the pockets 22, 24 and is preferably generally shaped as a sideways "U". The notch 60 may extend inwardly to a depth such that its inner point A is roughly aligned with the inner fold line 38 (see FIG. 2) and the outer fold line 42 (see FIG. 1) of each lower panel 18, 20. Thus, the upper edge of the pocket reinforcing strip 34 preferably forms the lower edge of the notches 60. The notches 60 and expansion panels 44, 46 on each side of the folder 10 cooperate to provide an expandable pocket. When one or both of the pockets 22, 24 are filled with paper, the lower panels 18, 20 are pulled away from their respective side panels 12, 14. This also pulls the expansion panels 44, 46 away from the side panels 12, 14 (i.e. such that the expansion panels 44, 46 are not parallel to the plane of the associated side panel). The expansion panels 44, 46 also move away from each other (i.e. each pivots about the middle fold line 40) when the pockets 22, 24 are expanded.

The notch 60 is preferably located at the upper end or free edge 61 of the side edge 63 of a lower panel 18, 20, although the notch 60 may have other locations. The notches 60 enables the lower panels 18, 20 to pull away from the respective side panels 12, 14 while reducing the propensity of the side panels 12, 14 to tear.

Figure 3:
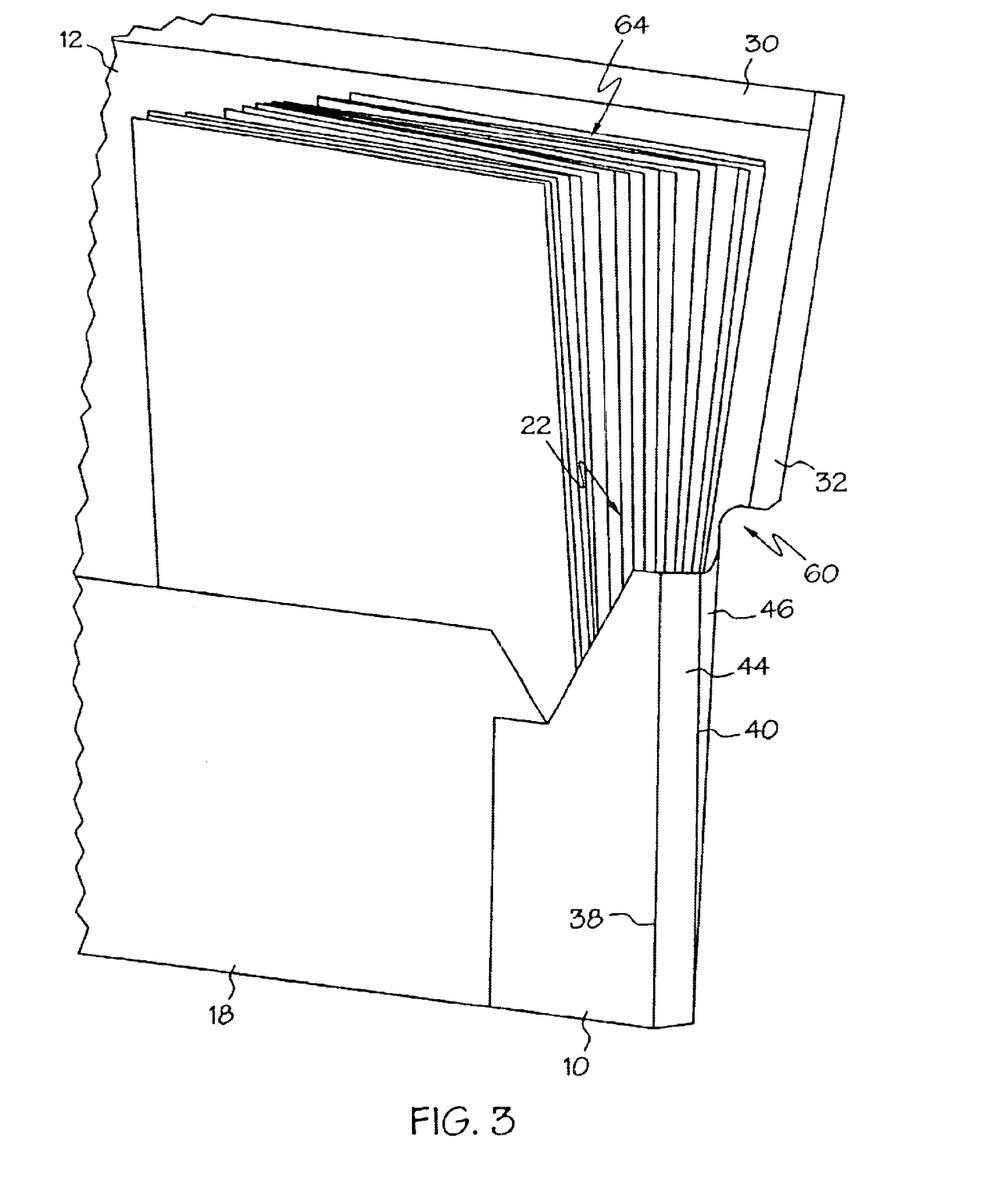
FIG. 3 is a perspective view of part of the folder of FIG. 1, shown filled with papers.

When the pockets 22, 24 are filled to their maximum capacity, the expansion panels 44, 46 may be in a nearly vertical position when the folder 10 is laid flat against on a surface; that is, the expansion panels 44, 46 may be located in a plane that is generally perpendicular to the plane of its respective side panel. For example, FIG. 3 illustrates a side view of the folder 10 when one of the pockets 22 of the folder 10 is filled with a plurality of papers 64. In this state, the expansion panels 44, 46 are each in a nearly vertical orientation. When the expansion panels 44, 46 are pulled into this position, the pocket 22 has a greater volume, and in this manner the expansion panels 44, 46 increase the capacity of the folder 10.

As shown in FIG. 2, each side panel 12, 14 also includes an inner fold line 68 located adjacent the center fold line 16. The inner fold lines 68 and center fold line 16 define a pair of inner expansion panels 70. When the pockets 22, 24 are filled with papers 64 as shown in FIG. 3, the inner expansion pockets 70 may shift out of the plane of their respective side panels 12, 14.

When the pockets 22, 24 of the folder 10 are filled, the inner expansion panels 70 may be nearly perpendicular to the plane of the side panels 12, 14 when the folder 10 is in a closed position (i.e. the expansion panels 70 are located in an almost vertical position).

Figure 1:
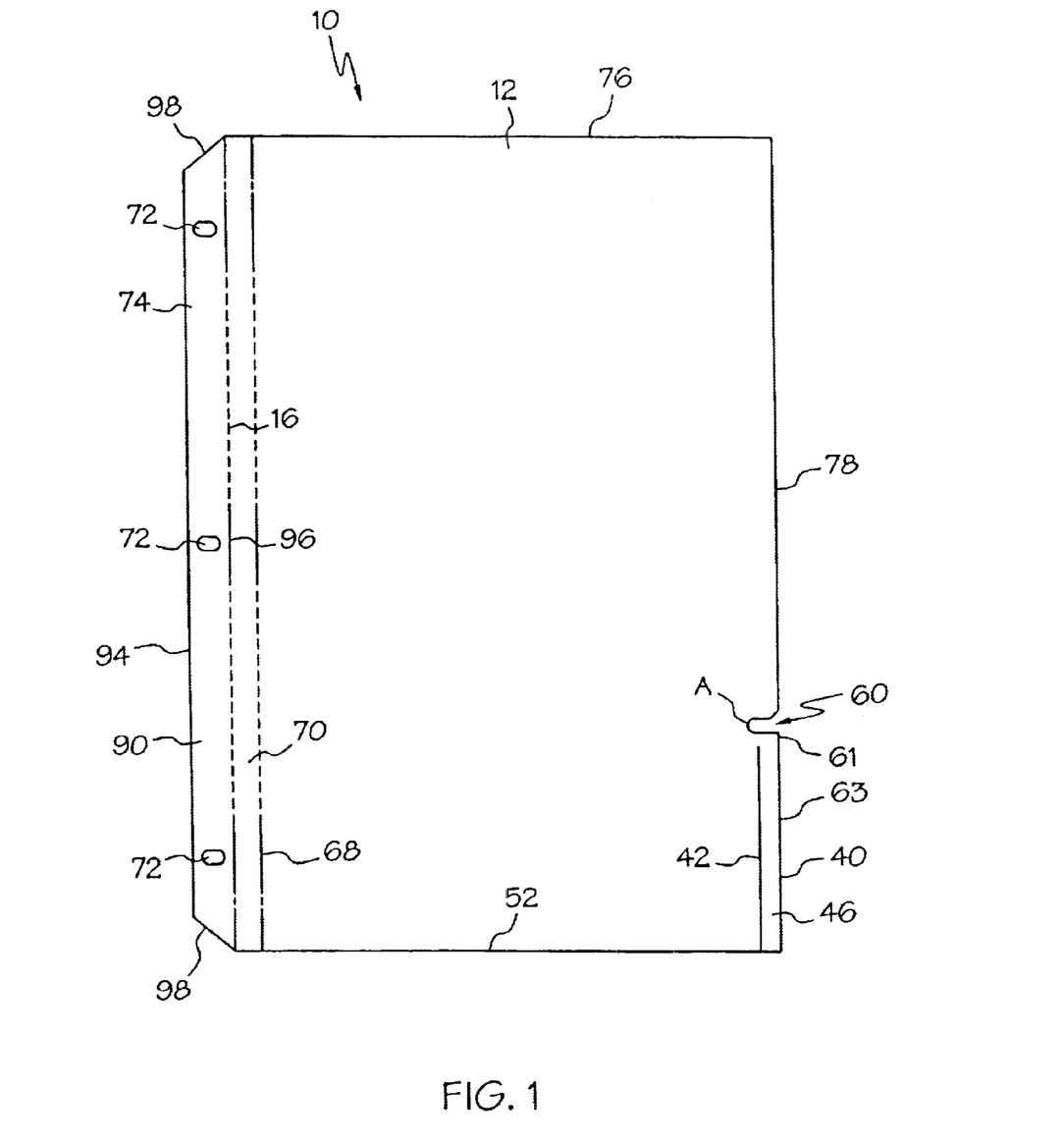
FIG. 1 is a front view of one embodiment of the folder of the present invention, showing the folder in its closed position.

The inner fold lines 68 are generally perforated along their length to provide increased expansion capabilities. However, as shown in FIG. 1, the inner fold lines 68 are preferably not perforated at those portions of the fold lines 68 located adjacent the holes 72 in the spine 74. The portions of the inner fold lines 68 adjacent the holes 72 are preferably scored but not perforated to increase the strength of the folder 10 adjacent the holes 72. Additional inner fold lines (not shown) forming additional inner expansion panels may be added to the folder 10, as desired in order to increase the capacity of the folder 10.

As shown in FIG. 4, a blank 50 may be used in a preferred method for forming the folder 10 of the present invention. In order to form the folder I 0 from the blank 50, the lower panels 18, 20 are folded about their fold lines 52, 54 until each lower panel 18, 20 lies against its respective side panel 12, 14. The top reinforcing strips 30 are folded inwardly about their fold lines 76, the side reinforcing strips 32 are folded inwardly about their fold lines 78, and the pocket reinforcing strips 34 are folded inwardly about their center fold lines 40. The top 30 and side 32 reinforcing strips are then adhered to their respective side panels 12, 14. The pocket reinforcing strips 34 are adhered to their respective lower panels 18, 20.

The blank 50 includes a pair of notch cutouts 80, each notch cut-out 80 including a generally oval-shaped head portion 82 and a neck portion 84. After the side reinforcing strips 32 and pocket reinforcing strips 34 are folded about their respective fold lines 78, 40, the head portions 82 forms the notches 60 in each side panel 12, 14. Each head portion 82 includes a small "V" shaped notch 86 to help guide the folding of the side reinforcing strips 32 about their fold lines 78. The flange portion 88 of the side reinforcing strips 32 provide reinforcing about the notches 60 to help reduce tearing of the notches (in particular, the inner portions A of the notches 60 are reinforced by the flange portions 88, see FIG. 2).

Although illustrated in conjunction with a two-pocket folder, the notch 60 and expansion panels 44, 46, 70 of the present invention may be used in any folder having a pocket, including folders having a single panel and single pocket. Furthermore, the expansion panels 44, 46 need not necessarily be defined by score lines. That is, if the score lines 38, 42, were not included in the folder 10, the pockets 22, 24 would still be expandable due to the presence of the notches 60. The score lines 38, 42 merely provide a guide for the expansion of the pockets 22, 24. Thus, the term "expansion panel" (also termed an "expansion portion) includes those portions of the folder that can shift to a position out of the plane of the side panels 12, 14, whether such "panel" is defined by a score line or not.

Returning to FIG. 4, the blank 50 also includes a pair of spine portions 90, 92 separated by a spine fold line 94. Each spine portion 90, 92 includes a set of corresponding holes 72a, 72b. The spine portions 90, 92 are folded toward each other about the spine fold line 94 until they are interfacially aligned. The spin portions 90, 92 are then adhered together to form the spine 74. The set of holes 72a are aligned with the set of holes 72b to form the holes 72 (FIG. 1). After the spine portions 90, 92 are pulled together, the outer spine fold lines 96 are pulled together to form the center fold line 16 shown in FIG. 2. Each outer spine fold line 96 preferably has the same pattern of perforations and scoring as the inner fold lines 70, although this pattern is not visible in the center fold line 16 in FIG. 2. As shown in FIG. 1, the spine 74 extends rearwardly from the body of the folder 10. A binder, such as a three ring binder (not shown), can be passed through the holes 72 in the spine 74 to attach the folder 10 to the binder. The holes 72 formed in the spine 74 are preferably generally oval or elliptical shaped to make it easier to attach the folder 10 to a binder.

An advantage provided under the present invention is that when the folder 10 is attached to a binder, the binding mechanism does not pass through the side panels 12, 14 of the folder, but instead passes only through the spine 74. Thus, when the binder rings are passed through the spine 74, the binder rings are isolated from the contents received in the pockets 22, 24 of the folder 10, and therefore the binder does not contact or interfere with the contents of the folder. Furthermore, the spine 74 is made of two-ply material (the spine portions 90, 92), and therefore the spine 74 is reinforced to prevent the binder rings from pulling through holes 72 of the spine 74. The spine 74 may be further reinforced as desired. However, it should be understood that nearly any method of forming a spine located remotely from the internal pockets of a folder may be used without departing from the scope of the present invention. Thus, the spine 74 may be single ply, may be formed of different materials than the rest of the folder 10, may formed by attaching the spine to a pre-formed folder, or may be formed by other methods. As shown in FIG. 1, the spine 74 preferably has chamfered outer corners 98 to reduce interference between the spine 98 and the binding mechanism of the binder.

The blank 50 and folder 10 are preferably made of sheet like material that is generally rigid yet includes some flexibility, including but not limited to cardboard, plastic, cloth and the like.

Figure 5:
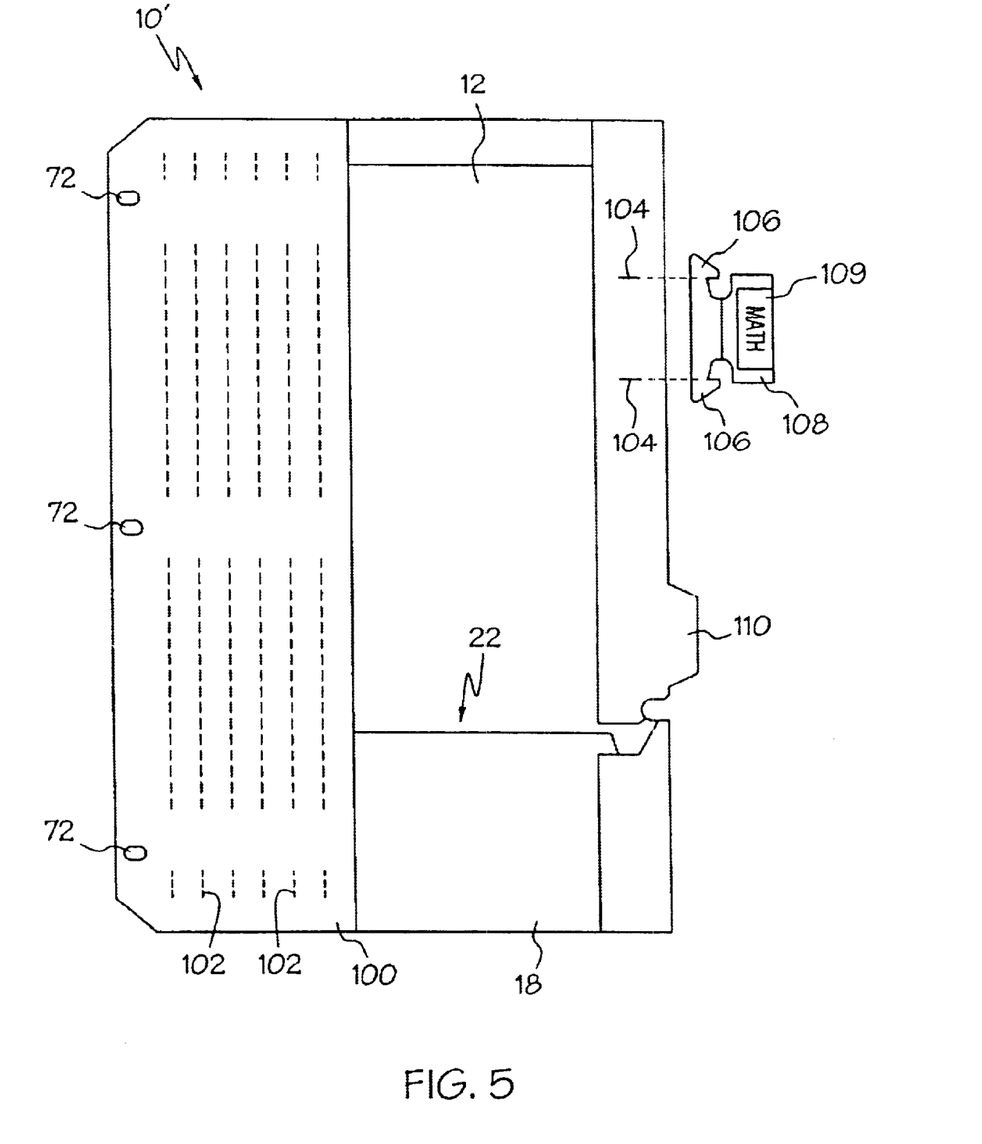
FIG. 5 is a front view of another embodiment of the folder of the present invention.

Another embodiment of the invention is shown in FIG. 5, wherein the folder 10' includes only a single side panel 12 and a single lower panel 18. The folder 10' includes a cover panel 100 to help retain papers in the folder 10'. The cover panel 100 normally lies flat against the side panel 12 and lower panel 18, but can pulled from the side panel 12 and lower panel 18 to fit papers into the pocket 22. The cover panel 100 includes a plurality of fold lines 102 having perforated and scored portions which enable the cover panel to be folded over papers received in the folder 10'. The portions of the folder 10' adjacent the holes 72 are reinforced by the presence of the cover panel 100. If the cover panel 100 is not used on the folder 10', the areas adjacent the holes 72 are preferably reinforced with an extra ply of material.

The folder 10' of FIG. 5 also includes a pair of label slots 104 adjacent the outer edge of the side panel 12. The slots 104 are shaped and located to receive a pair of feet 106 of a label tag 108. The label tag 108 is a well known mechanism in the art, and typically is used to label folders that are received in filing cabinets. A label tag 108 typically includes a two-ply piece of generally transparent material. A piece of paper 109 with indicia thereon can be inserted between the two plys of the label tag 108 to identify the contents of the folder 10'. In this manner, when a plurality of folders are received in a binder, each folder can be easily identified by its label tag 108. A plurality of slots 104 (not shown) may be located along the outer, upper or lower edges of the side panel 12 such that a label tag 108 can be located at nearly any location along the outer edges of the side panel. The folder 10' may also include a tab 110 that is integrally formed with an outer edge of the folder.

Having described the invention in detail and by reference to the preferred embodiments, it will be apparent that modifications and variations thereof are possible without departing from the scope of the invention.

What is claimed is:

1. A folder for receiving papers comprising:
   a first side panel including a recess formed therein; and
   a first lower panel facing said side panel, said first side panel and said first lower panel being joined to form a pocket therebetween, said folder including an outer edge, said recess being located adjacent an open end of said pocket and intersecting said outer edge to enable said pocket to expand without tearing said first side panel.

2. The folder of claim 1 wherein the area of said first side panel adjacent to said recess is reinforced to reduce the tearing of said area.

3. The folder of claim 1 further comprising an expansion portion extending between said first side panel and said first lower panel and located adjacent said recess, said expansion portion including a first expansion panel and a second expansion panel facing said second expansion panel, said first and second expansion panels being separated by an expansion fold line, and wherein said first expansion panel is movable away from said second expansion panel to increase the capacity of said pocket.

4. The folder of claim 3 wherein said first expansion panel pivots about said expansion fold line when said first expansion panel moves away from said second expansion panel.

5. The folder of claim 3 further comprising a inner fold line located between said first lower panel and said first expansion panel and an outer fold line located between said first side panel and said second expansion panel.

6. The folder of claim 3 wherein said expansion fold line forms at least a portion of an outer edge of said folder.

7. The folder of claim 3 wherein an upper edge of said expansion portion forms a lower edge of said recess.

8. The folder of claim 3 wherein said expansion portion is connected to a side edge of said first lower panel and a side edge of said first side panel, and wherein said first side panel and said first lower panel are connected along their bottom edges form said pocket.

9. The folder of claim 1 further comprising a second side panel attached to said first side panel, said first and second side panels being separated by a center fold line.

10. The folder of claim 9 wherein said first and second side panels each include a center expansion panel extending parallel to, and located adjacent to, said center fold line, said center expansion panels being movable to a position wherein each center expansion panels forms an angle with its respective side panels to increase the capacity of said folder.

11. The folder of claim 10 wherein each center expansion panel is defined by said center fold line and a generally perforated line extending generally parallel to said center fold line.

12. The folder of claim 11 wherein each generally perforated line includes non-perforated portions to increase the strength of said folder adjacent said non-perforated portions.

13. The folder of claim 10 wherein each center expansion panel is defined by said center line and a score line located on either side of said center expansion panel.

14. The folder of claim 1 wherein said recess is a generally "U" shaped cutout in said first side panel.

15. The folder of claim 1 further comprising a spine extending rearwardly from one of said first side panel or said first lower panel, said spine having a set of holes for attaching said folder to a binder.

16. The folder of claim 15 wherein said spine includes tapered upper and lower corners to reduce interference between said spine and said binder.

17. The folder of claim 1 wherein said lower panel includes a tapered inner corner to facilitate laterally sliding papers into said pocket.

18. The folder of claim 1 further comprising a cover panel at least partially covering said first side panel and said first lower panel to retain papers received in said pocket.

19. The folder of claim 18 wherein said cover panel includes a plurality of fold lines such that said cover panel can be folded about one of said fold lines to fold over a set of papers received in said pocket.

20. The folder of claim 1 wherein said first side panel includes at least two slots in an outer edge thereof to receive a label tag therein.

21. A folder for receiving papers comprising:
   a side panel including a lower edge, a side edge and a recess formed therein; and
   a lower panel facing said side panel, said lower panel including a lower edge and a side edge, said lower edges and side edges of said side panel and said lower panel being joined to form a pocket therebetween, said folder including an outer edge, said recess intersecting said outer edge, said side edge of said lower panel including an upper end that is located adjacent said recess, wherein said recess enables said pocket to expand without tearing said first side panel.

22. The folder of claim 21 wherein said recess enables said lower panel to move away from said side panel.

23. The folder of claim 9 wherein said recess is generally "U" shaped having an open end, and wherein said open end of said "U"-shaped recess generally faces away from said center fold line.

24. The folder of claim 1 wherein said recess is spaced away from said first lower panel such that said recess is not located over said first lower panel.

25. The folder of claim 1 wherein said recess extends through the thickness of said folder.

26. A folder for receiving papers comprising:
   a generally planar side panel including a notch formed therein; and
   a generally lower panel facing said side panel, said lower panel having a height less than a height of said side panel, said side panel and said lower panel being joined to form a pocket therebetween, said folder including an outer edge, said notch being located adjacent an open end of said pocket and intersecting said outer edge of said folder.

27. A folder for receiving papers comprising:

a generally planar side panel; and a generally lower panel facing said side panel, said lower panel having a height less than a height of said side panel, said side panel and said lower panel being joined to form a pocket therebetween, said folder including an outer edge, said side panel including a free edge located adjacent an open end of said pocket and intersecting said outer edge of said folder.

28. A folder for receiving papers comprising:

a front panel having a pair of opposed faces;

a back panel having a pair of opposed faces, said front panel being joined to said back panel such that at least part of one of said faces of said front panel faces and is joined to at least part of one of said faces of said back panel to form a spine, said spine including at least two spaced holes for inserting said folder into a binder; and a pocket on the inner surface of at least one of said front and back panels, a slot being formed in said panel having said pocket and being located opposite said spine and adjacent the opening of said pocket to prevent said panel having said pocket from tearing when said pocket is filled.

29. The folder of claim 28 further comprising a flap located along an upper edge of said at least one of said front and back panels to retain papers in said pocket.

30. The folder of claim 28 wherein said folder includes an outer edge, and wherein said slot intersects said outer edge.

31. The folder of claim 28 wherein said spine is a two-ply thick spine, each ply corresponding to at least a portion of one of said front and back panels.

32. The folder of claim 28 wherein each of said front panel and said back panel includes a plurality of edge surfaces extending between said opposed faces.

33. The folder of claim 28 wherein said at least part of one of said faces of said front panel is directly joined to said at least part of one of said faces of said back panel such that said joined faces remain generally parallel to each other.

34. The folder of claim 33 wherein said faces are joined at a location spaced apart from an inner edge of said faces.

35. A folder for receiving papers and other loose articles comprising:

a first side panel including a spine portion having a pair of opposed faces;

a second side panel coupled to said first side panel, said second side panel including a spine portion having a pair of opposed faces, said first and second panels being made from a single piece of material and being divided by a hinge line; and a spine extending generally outwardly from said hinge line, said spine including said spine portions of said first and second side panels joined together such that one of said faces of said spine portion of said first side panel faces and is joined to one of said faces of said spine portion of said second side panel and including a set of spaced holes for attaching said folder to a binder.

36. The folder of claim 35 wherein said first panel and said second panel can rotate relative each other about said hinge line.

37. The folder of claim 35 wherein said first panel and said second panel each include a pocket for receiving papers and other loose articles therein.

38. The folder of claim 37 wherein each pocket is formed by a lower panel that lies against a respective side panel.

39. The folder of claim 35 wherein said spine is a two-ply thick spine, each ply corresponding to a spine portion of one of said first and second side panels.

40. The folder of claim 35 wherein each of said spine portions includes a plurality of edge surfaces extending between said opposed faces.

41. The folder of claim 35 wherein said one of said faces of said spine portion of said first side panel is directly joined to said one of said faces of said spine portion of said second side panel such that said joined faces remain generally parallel to each other.

42. The folder of claim 41 wherein said faces are joined at a location spaced apart from an inner edge of said faces.

43. The folder of claim 35 wherein said spine is directly coupled to both said first and second side panels.

44. A folder for receiving papers and other loose articles comprising:

a first generally planar, flat side panel having a rear edge;

a second generally planar, flat side panel having a rear edge pivotally joined to or adjacent to said rear edge of first side panel to form a hinge line, both of said panels being pivotable about said hinge line, said folder being movable to a closed position wherein said side panels are generally parallel and facing each other; and a spine extending generally outwardly from said hinge line and away from said side panels, wherein said spine is a two-ply spine.

45. The folder of claim 44 wherein said spine includes two discrete generally flat planar spine portions, each spine portion including a pair of opposed faces which define the majority of the surface area of the associated spine portion, and wherein one of said faces of one of said spine portions faces and is directly joined to one of said faces of the other one of said spine portions.

46. The folder of claim 44 wherein said spine includes two discrete spine portions, each spine portion being unitary with one of said side panels.

47. The folder of claim 46 wherein both of said side panels are unitary.

48. The folder of claim 44 wherein said spine includes a plurality of holes located therethrough for coupling said folder to a binding mechanism.

* * * * *